US008625733B2

(12) United States Patent
Chahande et al.

(10) Patent No.: US 8,625,733 B2
(45) Date of Patent: Jan. 7, 2014

(54) NEUTRON SOURCE ASSEMBLY

(75) Inventors: Ashutosh Chahande, Columbia, SC (US); Thanh Do, Columbia, SC (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 754 days.

(21) Appl. No.: 13/018,478

(22) Filed: Feb. 1, 2011

(65) Prior Publication Data
US 2012/0195402 A1 Aug. 2, 2012

(51) Int. Cl.
*G21C 7/34* (2006.01)
*G21G 4/02* (2006.01)
*G21C 7/00* (2006.01)
*G21G 4/00* (2006.01)

(52) U.S. Cl.
USPC ........... 376/426; 376/156; 376/158; 376/207; 376/214; 376/409; 376/412; 376/434

(58) Field of Classification Search
USPC ......... 376/156, 190–193, 207, 209, 260–262, 376/327, 340–345, 347, 353, 361, 362, 364, 376/409, 412, 419, 158, 214, 426, 434
See application file for complete search history.

(56) References Cited

U.S. PATENT DOCUMENTS

| | | | | |
|---|---|---|---|---|
| 4,208,247 A * | 6/1980 | Impink, Jr. | ..................... | 376/191 |
| 4,678,618 A | 7/1987 | Wilson et al. | | |
| 5,098,647 A * | 3/1992 | Hopkins et al. | ............... | 376/353 |
| 5,200,138 A * | 4/1993 | Ferrari | .......................... | 376/209 |
| 5,425,070 A * | 6/1995 | Gosnell et al. | ................ | 376/260 |
| 6,327,321 B1 * | 12/2001 | Holman | ........................ | 376/262 |
| 7,412,021 B2 * | 8/2008 | Fetterman et al. | ............ | 376/327 |
| 7,995,701 B2 * | 8/2011 | Liu et al. | ........................ | 376/364 |
| 8,483,346 B2 * | 7/2013 | McCarty et al. | ............... | 376/327 |
| 2010/0111243 A1 | 5/2010 | Monchanin et al. | | |

* cited by examiner

*Primary Examiner* — Bernarr Gregory
(74) *Attorney, Agent, or Firm* — Joseph C. Spadacene; Westinghouse Electric Company LLC

(57) ABSTRACT

A neutron source rodlet assembly having a separate source capsule assembly that is not encapsulated within the neutron source rodlet assembly. The neutron source rodlet assembly is made up, at least in part, of a neutron source positioning rodlet assembly and the source capsule assembly configured such that assembly together is feasible at a remote site and they can be shipped separately. The source capsule assembly has outer and inner capsules with the outer capsule having a threaded stud at one end that mates with a complimentary threaded recess on the neutron source positioning rodlet assembly. The inner capsule contains a neutron source. The neutron source positioning rodlet assembly and the source capsule assembly are locked together at their interface when the threaded joint is completely tightened. A secondary neutron source material may also be encapsulated within a hollow portion of the neutron source positioning rodlet assembly.

14 Claims, 6 Drawing Sheets

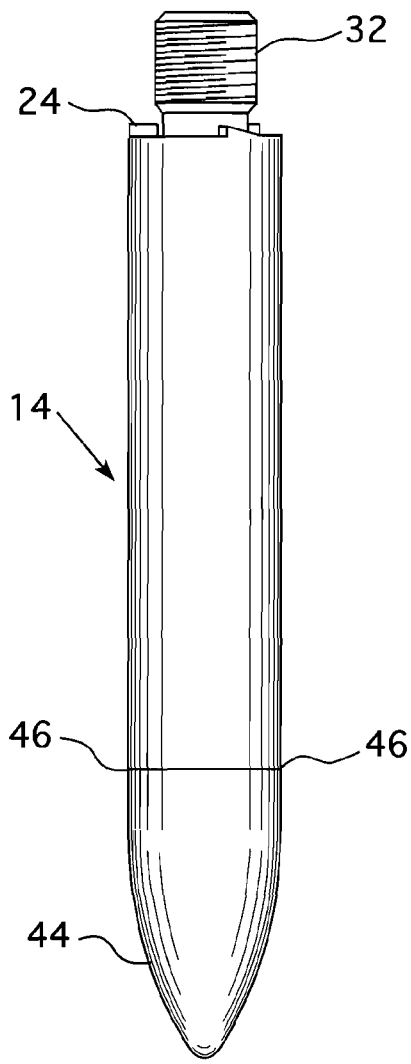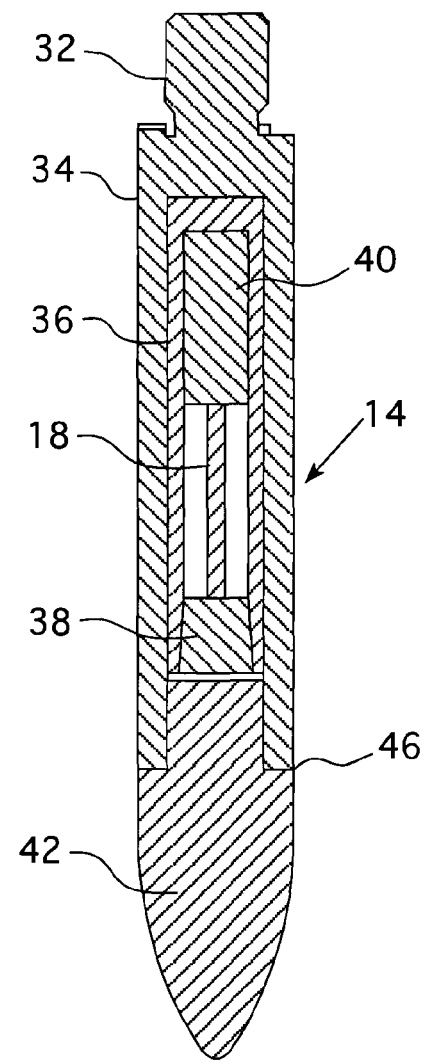

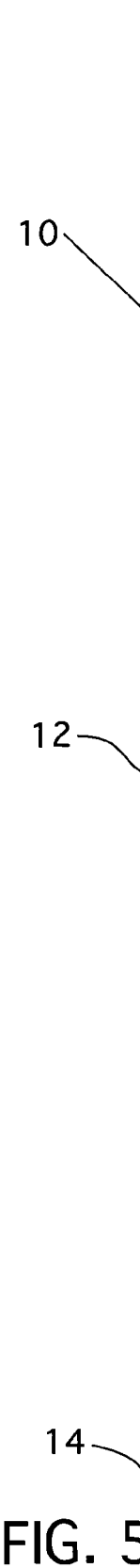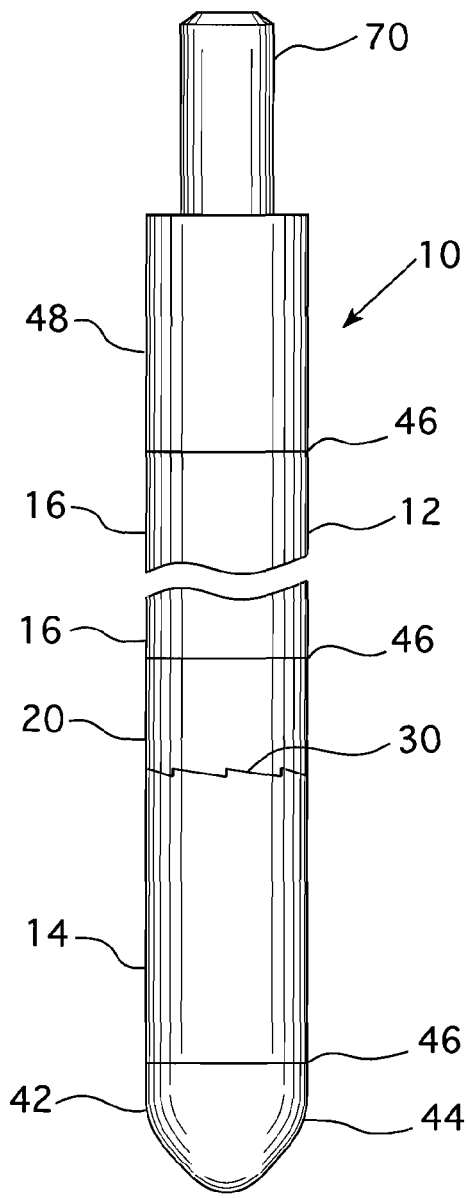
FIG. 5
FIG. 6

NEUTRON SOURCE ASSEMBLY

BACKGROUND

1. Field

This embodiment relates generally to nuclear reactor internals and more particularly, to neutron source rod assemblies that are involved during the startup and shutdown phases of a reactor core.

2. Related Art

The neutron source rod assemblies provide a base neutron level to ensure that X-core neutron detectors are operational and respond to source level neutrons during the period of low neutron activity such as for the initial core loading during the reactor startup. This is also the case during reactor shutdown for reloading and maintenance. The neutron source rod assemblies also permit detection of changes in the core multiplication factor during core loading and approach to criticality. The neutron sources used have included those referred to as "primary sources" and "secondary sources." Primary sources are those which are made of neutron emitting isotopes in the form in which they are initially placed in the reactor core during initial core loading. Secondary sources are those which are made of initially non-neutron emitting materials, which become neutron emitters during its residence in the first cycle of operation in the reactor core. The secondary sources are the neutron sources that are used during the subsequent shutdowns until the end of life of the secondary sources. Typical of the materials utilized for neutron sources are those including combinations of Polonium and Beryllium, Plutonium and Beryllium, Antimony and Beryllium, Americium-Beryllium and Curium, and sources including Californium. These sources can be relatively expensive. Because secondary sources are irradiated in-core, they are typically less expensive to ship than the primary sources. The secondary sources are easier to transport and handle as they are initially non-radiating.

The neutron sources are utilized during core startup and shutdown to ensure the operability of monitoring and detection apparatus, such as neutron detectors aligned with the reactor core and positioned outside of the reactor vessel. This is in accordance with governmental regulations applicable to the nuclear industry which dictate that means must be provided for monitoring or otherwise measuring and maintaining control of the fission process under all operating conditions, including shutdown.

Accordingly, primary neutron sources for commercial reactors have been positioned within the nuclear core, and remain within the core during at least one entire operating cycle. These neutron sources typically maintain a fixed position. In the larger reactors, the sources are inserted in selected fuel assemblies and extend within fuel assembly guide thimble tubes designed to receive movable control rod (element) assemblies. They are therefore inserted within fuel assemblies that do not receive a moveable control rod assembly. They are also disposed in assemblies close to the core periphery so as to be positioned close enough to activate the detection and monitoring apparatus outside of the reactor vessel. As the sources remain within an assembly for an entire core cycle, the primary sources, excluding those of Californium, are consumed by neutron induced fission and transmutation before the end of the first fuel cycle, when exposed to the intense neutron flux levels characteristic of power operation. Californium may continue to be active for more than one fuel cycle. As replacement of primary neutron sources with primary neutron sources is costly, the secondary sources, activated under the high neutron flux experienced during its first cycle of operation, are used as replacements.

Typically, a nuclear fuel assembly comprises a bundle of nuclear fuel rods and a support skeleton for those rods. The skeleton comprises a lower nozzle, an upper nozzle and guide thimble tubes which connect the two nozzles and which are intended to receive the rods of movable control rod assemblies for controlling the neutron flux level and thus the operation of the core of the nuclear reactor.

Each movable control rod assembly comprises a bundle of neutron absorbing rods which are retained by a support. This support is generally referred to as a "spider" and is constituted by an upper hub around which fins (also referred to as flukes) are distributed and provided with members for mounting the neutron absorbing rods.

During an operating cycle of the core, the movable control rod assemblies will be displaced in order to introduce to a greater or lesser extent their rods into the corresponding guide thimble tubes and thus to control the reactivity in the core of the nuclear reactor.

In the nuclear reactor core, some nuclear fuel assemblies are not provided with movable control rod assemblies but instead are provided with fixed core rod assemblies that are not subjected to controlled movement during an operating cycle of the core.

This is particularly the case for burnable poison rod assemblies. At least some of the rodlets thereof comprise burnable neutron poison rodlets which will allow the concentration of boron dissolved in the water of the cooling system to be reduced, primarily at the beginning of a cycle.

This is also the case for thimble plug rod assemblies with which some fuel assemblies are provided. The rodlets of these thimble plug rod assemblies occupy the guide thimble tubes of the relevant fuel assemblies in order to limit the hydraulic flow. Typically, at least some of the thimble plug rod assemblies and/or some of the burnable neutron poison rod assemblies are provided with neutron source elements and at least one of the neutron source elements may be a primary neutron source element. Each of the assemblies containing a primary source element, also referred to as a primary neutron source rod assembly, has at least one primary source rodlet assembly that contains a primary radioactive material such as Californium-252 source material, inside a source capsule assembly, which spontaneously emits neutrons and is used for one cycle during the initial core loading and reactor start-up. After the first cycle of operation, throughout the remaining cycles, neutrons are supplied by the secondary neutron source rod assemblies, as mentioned above. The primary neutron source rod assemblies are typically removed after the first cycle, but can remain in the core through the first three cycles and are then retired with the spent fuel assembly that they occupied.

Typically, the primary neutron source rod assembly includes at least one primary neutron source rodlet assembly and fifteen to twenty-three (depending on fuel assembly array type) core component spacer rodlets (also known as thimble plug rodlets) or burnable neutron poison rodlets, connected to a stationary spider assembly or hold down assembly (mounting assembly). Such a mounting assembly is described in U.S. Patent Publication 2010/0111243, published May 6, 2010. The thimble plug rodlets or burnable neutron poison rodlets increase the weight to aid the insertion of the primary neutron source assembly into a fuel assembly. The primary neutron source rodlet assembly is typically fabricated by a subcontract manufacturer while the remainder of the primary neutron source rod assembly (core component assembly) is fabricated and assembled by the nuclear reactor system original equipment manufacturer (OEM). Typically, the primary source rodlet assembly component parts are supplied by the reactor original equipment manufacturer, and the subcontract manufacturer assembles them along with the source capsule assembly according to approved procedures. The core component assembly, which includes the mounting assembly and thimble plug rodlets or burnable neutron poison rodlets, is fabricated by the reactor original equipment manufacturer. The core component assembly and the primary neutron source rodlet assembly are shipped separately to the assembly site location and are then assembled together on site per the appropriate assembly procedures. The site assembly procedures must address the safety requirements associate with a large irradiated component, and are typically written for specific plant sites and source configurations. Alternatively, the primary source rodlet assembly could be manufactured by the reactor original equipment manufacturer if hot cell facilities are available, but even then it's likely the primary neutron source rodlet assembly and the remainder of the primary neutron source rod assembly (core component assembly) would be shipped separately due to the differences in the packaging and shipping requirements.

The primary neutron source rodlet assembly typically comprises a top extension end plug which is adapted to be connected to the stationary spider assembly or hold down assembly, a stainless steel cladding, a bottom end plug and a source capsule assembly held in a selected location with stainless steel or aluminum oxide spacers. Sometimes there is a spring clip to hold things together. There is a stainless steel protective cap used to protect the upper end plug threads during shipping. However, the cap is discarded once the primary neutron source rodlet assembly is assembled into the core component assembly.

The source capsule assembly consists of inner and outer capsules encasing a neutron source material. The source material, Californium Cf252, for example, is used in the form of Californium Oxalate/Palladium composite wire with nearly 1.19 millimeter×1.19 millimeter square cross section that will pass through a 1.91 millimeter diameter hole. The individual wire is then cropped into segments containing approximately 200-500 micrograms of Californium Cf252 depending on the need of source strength at start-up. Sufficient amounts of wire, producing a calculated neutron emission of the required source, are sealed in the inner capsule. Some neutron emission strength requirements will result in a two-wire case and some will be acceptable with a one-wire case.

The source capsule assemblies are made of type 308 stainless steel and sealed hermetically by welding. The capsule assemblies may also be made of zirconium alloy or a similar compatible material. A Californium Oxalate/Palladium wire is captured inside the inner capsule assembly. Sometimes the inner and/or outer capsule is back-filled with helium for better heat transfer. The source capsule assembly is designed to withstand core operational conditions, such as temperature, pressure and irradiation effects. The source capsule is also designed to safely reside in the spent fuel pool for the rest of the plant life.

The primary source rodlet assembly must contain a sufficient curie level of Californium-252 to provide count rates of at least two counts per second at the nearest source range detector for at least six months after the initial start-up of the first reactor cycle. The axial location of the center of the source material should be approximately aligned with the axial location of the center of the source range detectors on the outside of the reactor vessel. FIG. 1 shows the current design flow chart. The primary neutron source rodlet assembly component parts are typically supplied by the reactor original equipment manufacturer and assembled by a subcontract manufacturer along with the source capsule assembly, in accordance with approved procedures. The core component assembly, which includes the thimble plug rodlets and/or burnable neutron poison rodlets and mounting assembly, is fabricated and assembled by the reactor original equipment manufacturer. The core component assemblies and the primary neutron source rodlet assemblies are shipped separately to the site location and then assembled together on site. The site assembly procedures must address the safety requirements associated with a large irradiated component, and are typically written for specific plant and source configurations.

There are a number of disadvantages associated with the current design and manufacturing process. First of all, the primary neutron source rodlet assemblies are shipped in a special shipping container that is about fifteen to twenty feet long and about six feet in diameter. The container is shipped to the assembly site by air, because time is of the essence, and, not all air carriers are equipped and licensed to handle such a large container. In addition, the cost for such a shipment is considerably high, especially for overseas shipments. Secondly, a large enough hot cell is required to accommodate the entire primary neutron source rodlet assembly during the welding of the upper end plug. Also, testing of the upper weld needs to be performed in the same hot cell. However, the hot cell is not required when the lower end plug is welded, because that occurs before the source capsule assembly is encapsulated in the rodlet. Thirdly, once the work on the primary source rodlet assemblies in the hot cell is complete, they are transferred to the large shipping container. During this transfer, there is a significant risk of over exposure to the operators as the primary source rodlet assembly needs to leave the hot cell before it is inserted into the shipping container. Lastly, special equipment is required at the site to handle the large shipping container.

Accordingly, a new neutron source rod assembly design is desired that will facilitate an improved manufacturing process that will overcome the foregoing disadvantages.

Additionally, a new neutron source rod assembly design is desired that will reduce the size and awkwardness of the irradiating components that requires special handling when shipped to the assembly site.

Furthermore, a new manufacturing process for the neutron source rod assemblies is desired that reduces the cost and radiation exposure encountered in handling and shipping the individual assemblies to the assembly site.

SUMMARY OF THE INVENTION

The foregoing objects are achieved employing a new neutron source rod assembly design for a nuclear reactor that has a separate neutron source positioning rodlet assembly and source capsule assembly. The neutron source positioning rodlet assembly has an upper coupling for connecting to a mounting assembly and an elongated substantially round body sized to slidingly fit within a guide thimble tube of a nuclear fuel assembly. The body extends a preselected distance from the upper coupling along an axis coinciding with an elongated dimension of the substantially round body and terminates in a lower coupling. The neutron source rod assembly further includes a source capsule assembly which sealably encloses a neutron source material. The source capsule assembly is sized to slidingly fit within the guide thimble tube and has an upper coupling configured to mate with the lower couplings of the neutron source positioning rodlet assembly. The neutron source positioning rodlet assembly and the source capsule assembly are capable of being shipped independently of each other and fixedly connected to each other at an assembly site. Preferably, the preselected distance that the body of the neutron source positioning rodlet assembly extends from the mounting assembly is chosen to position the source capsule assembly at a desired elevation in the core relative to the elevation of the source range X-core detectors.

In one embodiment, the neutron source positioning rodlet assembly lower coupling and the source capsule assembly upper coupling are mechanical couplings that are configured to mate with each other. Preferably, the neutron source positioning rodlet assembly lower coupling is one of either a male or female threaded coupling and the source capsule assembly upper coupling is the other of the male or female threaded coupling.

Desirably, the source capsule assembly is not substantially larger than necessary to contain sufficient neutron source material to provide the neutrons required for a specified X-core source range detector count rate during reactor startup.

In one embodiment of the neutron source rod assembly, the neutron source positioning rodlet is a solid rod. In another embodiment of the neutron source rod assembly, the neutron source positioning rodlet assembly is, at least in part, formed from a hollow tube that is capped at each end. Preferably, in the latter embodiment, the neutron source material in the source capsule assembly is a primary neutron source material and the hollow tube contains a secondary neutron source material.

The invention also contemplates a method of manufacturing a neutron source assembly comprising a mounting assembly, a plurality of thimble plug rodlets (and/or burnable neutron poison rodlets), a neutron source positioning rodlet and a source capsule. The method includes the step of manufacturing the mounting assembly, the plurality of thimble plug rodlets (and/or burnable neutron poison rodlets) and the neutron source positioning rodlet assembly in a first manufacturing facility remote from an assembly site at which the neutron source assembly is intended to be inserted into a fuel assembly. As part of the foregoing manufacturing step, the neutron source positioning rodlet is formed to have an upper coupling to connect to the mounting assembly and an elongated, substantially round body that is sized to slidingly fit within a guide thimble tube of a nuclear fuel assembly. The body of the neutron source positioning rodlet assembly extends a preselected distance from the upper coupling along an axis coinciding with an elongated dimension of the substantially round body and terminates in a lower coupling. The method also includes the step of manufacturing the source capsule assembly in a second manufacturing facility remote from the assembly site, with the source capsule assembly sealably enclosing a source material. The source capsule assembly is sized to slidably fit within the guide thimble tube at the assembly site and has an upper coupling configured to mate with the lower coupling of the neutron source positioning rodlet assembly. Desirably, the preselected distance substantially extends from the mounting assembly to an elevation in the fuel assembly at which the neutron source material is to be situated.

The method further includes the steps of shipping the mounting assembly, the plurality of thimble plug rodlets (and/or burnable neutron poison rodlets) and the neutron source positioning rodlet assembly to the assembly site; shipping the source capsule assembly to the assembly site; assembling the source capsule assembly to the lower coupling of the neutron source positioning rodlet assembly at the assembly site; and inserting the neutron source rod assembly into a fuel assembly at the assembly site.

In one embodiment, the assembly site is a nuclear reactor at which the neutron source rod assembly is to be used. In still another embodiment, the assembly site is a nuclear fuel assembly manufacturing facility.

In addition, in one embodiment, the mounting assembly, the plurality of thimble plug rodlets (and/or burnable neutron poison rodlets) and the neutron source positioning rodlet assembly are assembled together at the first manufacturing facility. In another embodiment, the mounting assembly, the plurality of thimble plug rodlets (and/or burnable neutron poison rodlets) and the neutron source positioning rodlet assemblies are assembled together at the assembly site.

BRIEF DESCRIPTION OF THE DRAWINGS

A further understanding of the invention can be gained from the following description of the preferred embodiments when read in conjunction with the accompanying drawings in which:

FIG. 3 is a perspective view of the source capsule assembly in accordance with the disclosed embodiment of this invention;

FIG. 4 is a cross-sectional view of the source capsule assembly illustrated in FIG. 3;

FIG. 5 is a perspective view of the neutron source positioning rodlet assembly with a source capsule assembly showing its relative dimensions;

FIG. 6 is a perspective view of the neutron source positioning rodlet assembly with the source capsule assembly shown in FIG. 5, enlarged and illustrated in foreshortened form;

DESCRIPTION OF THE PREFERRED EMBODIMENTS

Figure 1:
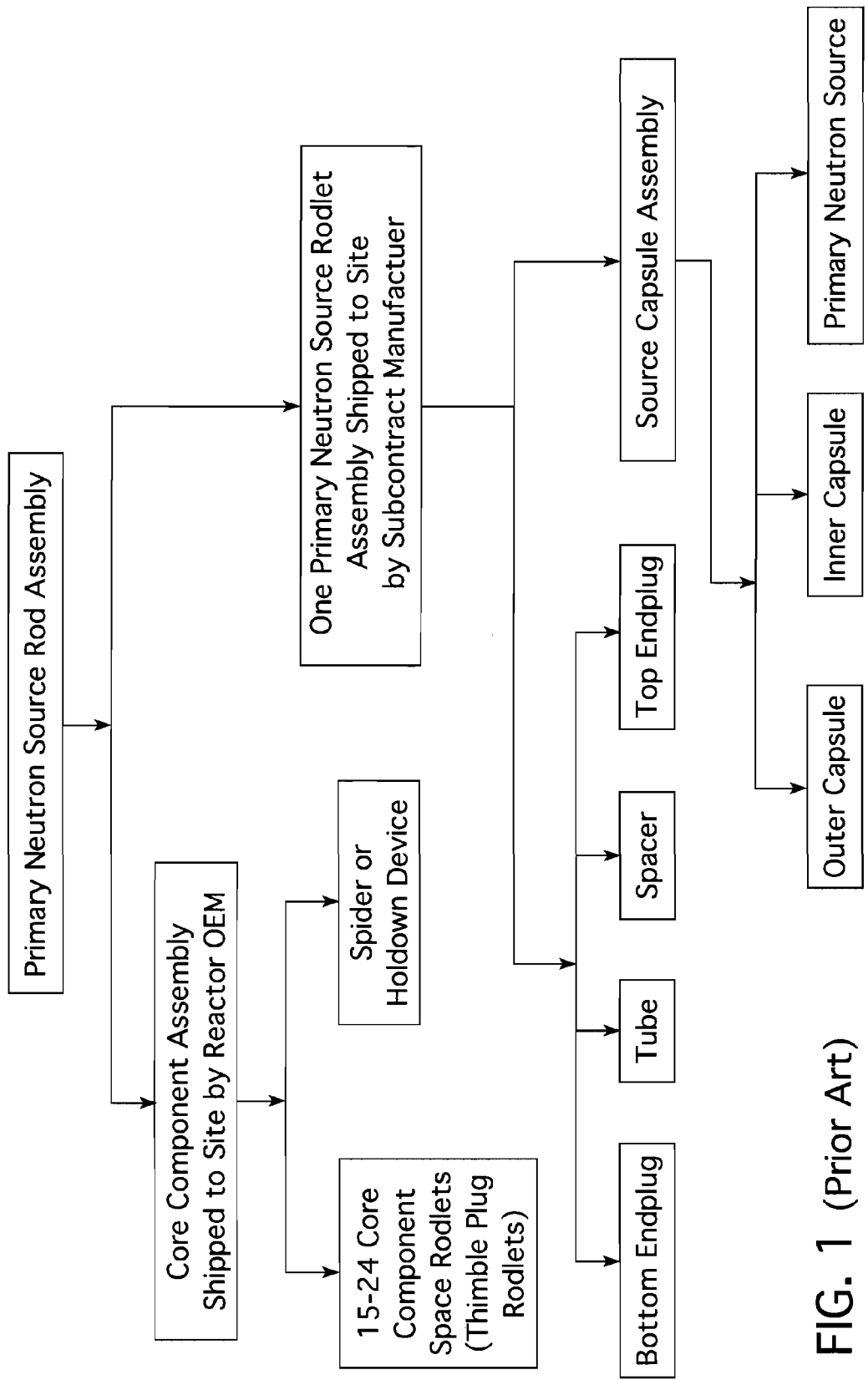
FIG. 1 is a flow diagram illustrating a manufacturing process of the prior art.
Figure 2:
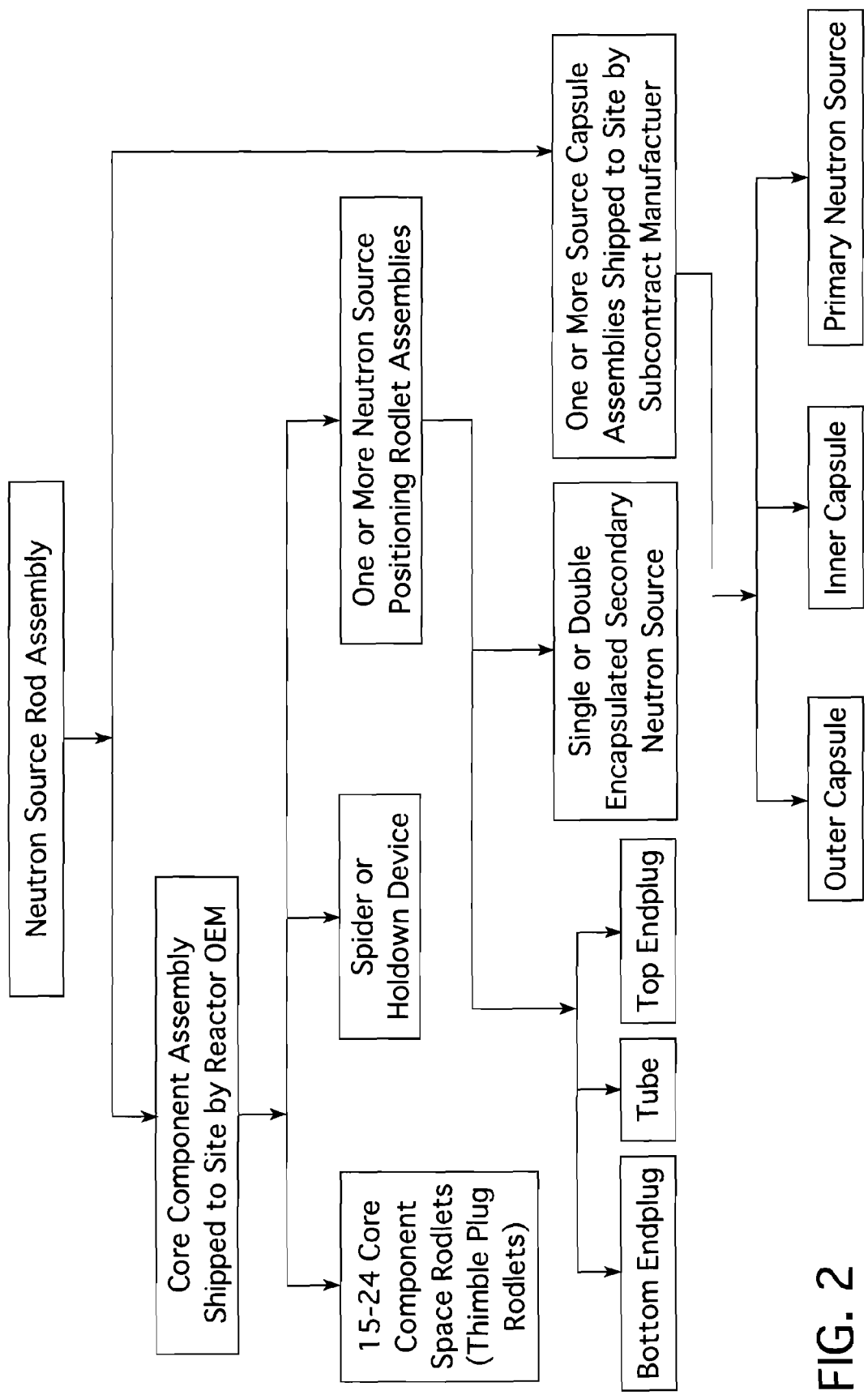
FIG. 2 is a flow diagram illustrating the manufacturing process in accordance with the disclosed embodiment of this invention.

FIG. 2 shows a manufacturing flow chart of the preferred embodiment. The major differences between FIGS. 1 and 2 is that the neutron source rodlet assembly, illustrated in FIGS. 5 and 6, will have a source capsule assembly, shown in FIGS. 3 and 4, that is not encapsulated within the cladding of the neutron source positioning rodlet assembly portion of the neutron source rodlet assembly. Referring to FIGS. 5 and 6, the neutron source rodlet assembly 10 comprises the neutron source positioning rodlet assembly 12 and the source capsule assembly 14 which is shown in more detail in FIGS. 3 and 4. The neutron source positioning rodlet assembly 12 and the source capsule assembly 14 are designed such that their assembly together is feasible at the assembly site at which they are intended to be employed.

Figure 8:
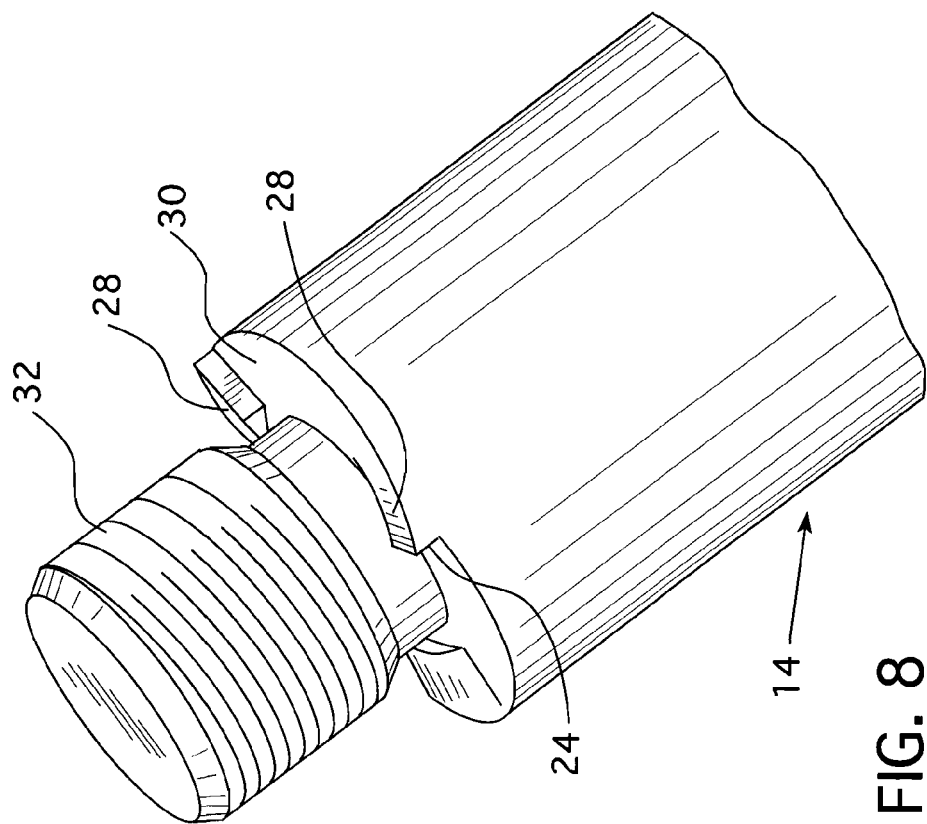
FIG. 8 is a perspective view of the upper coupling of the source capsule assembly.
Figure 7:
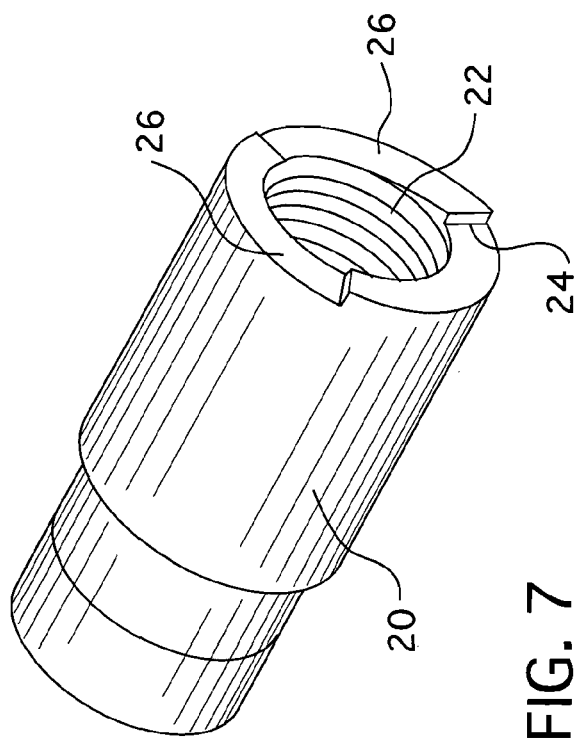
FIG. 7 is a perspective view of the neutron source positioning rodlet lower coupling illustrating the threaded interface with the upper coupling of the source capsule assembly.

The neutron source positioning rod assembly 12 preferably is either a solid or hollow cladding 16 constructed from stainless steel or zirconium alloy or similar compatible material of such a length that will axially position the source 18 in a desired location at the periphery of the core of the reactor. The lower end plug 20 of the neutron source positioning rodlet assembly 12 which is generally illustrated in FIG. 6 and shown in more detail in FIG. 7, has a threaded hole and a unique design feature 24 that is designed to connect securely to the source capsule assembly 14, though it should be appreciated that other forms of attachment may also be used. The unique locking feature 24 is a series of spaced inclined planes or curved surfaces 26 that mate with corresponding spaced inclined planes or curved surfaces 28 on the interface 30 of the source capsule assembly 14 with the neutron source positioning rod assembly 12. The interface 30 is better shown in FIG. 8 and includes a male threaded stud 32 that is designed to mate with the threaded hole 22 on the lower end plug of the neutron source positioning rodlet assembly 12. The source capsule assembly shown in more detail in FIGS. 3 and 4 includes outer and inner capsules, respectively 34 and 36. As mentioned above, the outer capsule 34 has a threaded stud 32 on one end that will be used to screw the source capsule assembly 14 into the neutron source positioning rodlet assembly at the assembly site location. The inner capsule 36 remains similar to the standard inner capsule currently employed and is sealed on three sides and closed at its lower end with an end plug 38. The end plug captures the source material 18 within the inner capsule 36. The source material 18, such as Californium Cf252, is held in position by an optional spacer 40. The lower end of the outer capsule 34 is an end plug 42 with a bullet nose 44 for easy insertion of the neutron source rodlet assembly into the guide thimble tubes within a fuel assembly. The lower end plug is fusion welded to the cladding of the outer capsule 34 at the interface 46, though it should be appreciated that other forms of attachment may be used. The total axial length of the source capsule assembly 14 is to be kept as short as is required to support the source material 18 to reduce the cost of handling and shipping a radioactive component.

The full length of the neutron source positioning rodlet assembly and the relative dimensions of its component parts can be better appreciated from FIG. 5. FIG. 6 shows an enlarged view in foreshortened form of the component parts with the interfaces of the source capsule assembly 14 and its lower end plug 42, of the neutron source positioning rodlet assembly 12, its lower end plug 20 and its upper end plug 48 fusion welded though it should be appreciated that other forms of attachment may also be used. The interface 30 of the neutron source positioning rodlet assembly 12 and the source capsule assembly 14 are screwed together until their inclined planes or curved surfaces 26 and 28 snap over each other with the raised (vertical or inclined) sides abutting to lock in position. It should be noted that there is no need for an upper end plug 48 and lower end plug 20 if the neutron source position rodlets are made of solid material and a secondary neutron source is not positioned within the neutron source position rodlets as hereafter described. In such case the required features for the upper and lower couplings may directly be machined.

Figure 9:
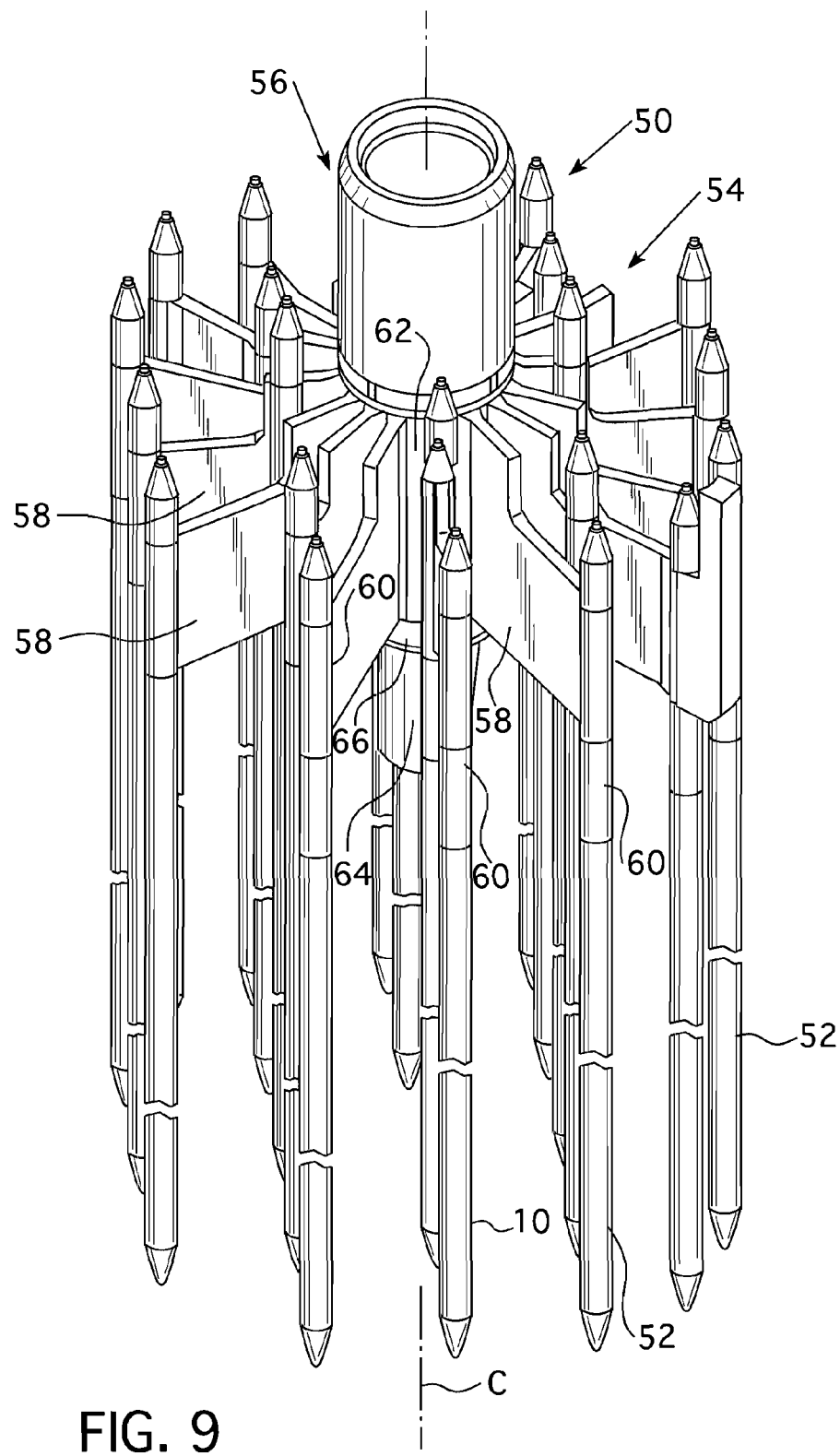
FIG. 9 is an elevational view of a neutron source rod assembly.

The design of this invention thus enables the manufacturing requirements of the source capsule assembly to be satisfied by a subcontract manufacturer and more cost effectively shipped to the assembly site where it can be assembled with the remaining components of the neutron source rod assembly (core component assembly). The dimension of the source capsule assembly is in the order of 1.5+/−0.5 inches (3.81+/− 1.27 cms.) long and 0.5 inches (1.27 cms.) in diameter. Therefore, the dimension of a shipping container would be relatively small and easier and less costly to handle. The expected size of the shipping container would be about five feet (1.5 meters) long and six feet (1.83 meters) in diameter. Thus, there will be more air carriers that are licensed and can handle this size container. The expected shipping costs will be lower and there will be more options for subcontract manufacturers that can manufacture the capsule assembly since a much smaller hot cell is required than is currently needed. The neutron source positioning rodlet assembly, shown in FIGS. 5 and 6, and the remaining neutron source rod assembly (core component assembly), which is shown in FIG. 9, can then be manufactured by the reactor original equipment manufacturer. The core component assembly, which will include the neutron source positioning rodlet assemblies (without the source capsule assemblies) will be assembled by the reactor original equipment manufacturer and shipped to the site separately from the source capsule assembly. Shipping the non radiated assemblies is a routine task.

A neutron source rod assembly 50 in the form of a stationary spider assembly is shown in FIG. 9. Nevertheless, it should be appreciated that for the purposes of this embodiment a hold down assembly could also have been shown without detracting from this concept or altering the design of the neutron source rod assembly other than the coupling 70. The coupling 70, shown in FIG. 6 is intended to mate with a hold down assembly rather than a spider assembly. For the purpose of convenience either the hold down assembly or the spider assembly may hereafter be referred to as a mounting assembly. The neutron source rod assembly 50 principally comprises a plurality of rods 52 at least one of which is a neutron source rodlet assembly 10, and a support 54 (mounting assembly). The support 54 has a spider shape which is generally similar to that used in the prior art for moveable neutron absorber rod assemblies, with the exceptions noted below. The support 54 which can therefore be referred to as a "spider assembly," principally comprises an upper hub 56 whose longitudinal center axis C is intended to be oriented vertically when the neutron source rod assembly 50 is arranged on a nuclear fuel assembly in a nuclear reactor core; fins or flukes 58 which extend radially outward from the hub 56 and which are distributed angularly in a substantially regular manner about the axis; and coupling systems 60 for mounting the rods 52 on the support 54. At least one of the coupling systems 60 mates with a mounting coupling 70 on the upper end plug 48 of the neutron source positioning rodlet assembly 12. One such coupling 70 intended to mate with a hold down assembly is shown in FIG. 6.

The support 54 is produced from a metal such as stainless steel which can withstand a high radiation exposure. The upper hub 56 has a hollow cylindrical shape with a circular base. It comprises a lower portion 62 from which the fins 58 extend. This lower portion 62 is, for example, integral with the fins 58. The lower portion 62 of the hub 56 and the fins 58 can be produced by means of molding, machining, or electro-erosion.

In one embodiment, the support 54 further comprises a back-up ring 64 that rests on the upper nozzle of the fuel assemblies with which the neutron source rod assembly is intended to be associated with. The ring 64 may comprise a collar 66 which may press downwards against a lower edge of the hub 56. A more detailed description of one such fixed spider assembly may be found in U.S. Published Application 2010/0111243A1.

In another embodiment, this invention includes a secondary neutron source 68 encapsulated within a hollow portion of the neutron source positioning rodlet assembly 12 (FIG. 5) above the source capsule assembly 14. The secondary neutron source may comprise Antimony-Beryllium (Sb—Be) pellets inside a hollow portion of the neutron source positioning rodlet assembly. A proper amount of stainless steel or aluminum oxide spacers may be employed below and above the Sb—Be pellets to achieve the desired location of the secondary neutron source when it is inserted within the fuel assembly. A spring clip or coil spring could be used to hold everything in place while creating enough plenum volume to accommodate fission gases. Alternately, the Antimony-Beryllium pellets could be placed inside a hermetically sealed stainless steel or zirconium tube with the tube then encapsulated within the hollow portion of the neutron source positioning rodlet assembly. The neutron source positioning rodlet assembly can then either be made up of a tubular cladding or a solid piece of metal having its lower section hollowed.

While specific embodiments of the invention have been described in detail, it will be appreciated by those skilled in the art that various modifications and alternatives to those details could be developed in light of the overall teachings of the disclosure. For example, one or more neutron source rodlet assemblies can be supported by some other mounting assembly, respectively within the guide thimble tubes of a fuel assembly, such as from the fuel assembly upper nozzle or a traditional control rod drive mechanism, without the use of a spider assembly or traditional hold down device, without departing from the concept of this invention. Similarly, the embodiments are applicable to non nuclear reactor applications of neutron sources such as oil exploration, cement manufacturing, road construction, etc. Accordingly, the particular embodiments disclosed are meant to be illustrative only and not limiting as to the scope of the invention which is to be given the full breadth of the appended claims and any and all equivalents thereof.

What is claimed is:

1. A neutron source rod assembly for a nuclear reactor comprising;
   a neutron source positioning rodlet assembly having an upper coupling for connecting to a mounting assembly and an elongated substantially round body sized to slidingly fit within a guide thimble tube of a nuclear fuel assembly, the body extending a preselected distance from the upper coupling along an axis coinciding with an elongated dimension of the substantially round body and terminating in a lower coupling; and
   a source capsule assembly sealably enclosing a neutron source material, with the source capsule assembly configured as a separate component from the neutron source positioning rodlet assembly, structured to be boxed and shipped separately, sized to slidingly fit within the guide thimble tube and having an upper coupling configured to mate with the lower coupling of the neutron source positioning rodlet assembly and wherein the neutron source positioning rodlet assembly and the source capsule assembly are configured to be fixedly connected to each other at an assembly site and the preselected distance substantially extends from the mounting assembly to an elevation in a core of the nuclear reactor at which the neutron source material is to be situated.

2. The neutron source rod assembly of claim 1 wherein the neutron source positioning rodlet assembly lower coupling and the source capsule assembly upper coupling are mechanical couplings that are configured to mate with each other.

3. The neutron source rod assembly of claim 2 wherein the neutron source positioning rodlet assembly lower coupling is one of either a male or female threaded coupling and the source capsule assembly upper coupling is another of the male or female threaded coupling that the one of either the male or female threaded coupling on the neutron source positioning rodlet assembly lower coupling will mate with.

4. The neutron source rod assembly of claim 1 wherein the source capsule assembly has an elongated axial dimension that is sufficient to contain sufficient neutron source material to provide the neutrons required for a specified X-core source range detector count rate during startup for the nuclear reactor, but is substantially shorter than the elongated dimension of the neutron source positioning rodlet assembly.

5. The neutron source rod assembly of claim 1 wherein the neutron source positioning rodlet assembly is a solid rod.

6. The neutron source rod assembly of claim 1 wherein the neutron source positioning rodlet assembly is at least in part formed from a hollow tube that is capped at each end.

7. The neutron source rod assembly of claim 6 wherein the neutron source material is a primary neutron source and the hollow tube contains a secondary neutron source material.

8. The neutron source rod assembly of claim 1 wherein the lower coupling of the neutron source positioning rodlet assembly and the upper coupling of the source capsule assembly lock together when fully connected.

9. The neutron source rod assembly of claim 8 wherein the lower coupling of the neutron source positioning rodlet assembly and the upper coupling of the source capsule assembly are threaded couplings and lock together when fully tightened.

10. A method of manufacturing a neutron source rod assembly comprising a mounting assembly, a plurality of thimble plug rodlets or a plurality of burnable neutron poison rodlets, a neutron source positioning rodlet assembly and a source capsule assembly, comprising the steps of:
    manufacturing the mounting assembly, the plurality of thimble plug rodlets or the plurality of burnable neutron poison rodlets and the neutron source positioning rodlet assembly in a first manufacturing facility remote from an assembly site at which the neutron source rod assembly is intended to inserted into a fuel assembly, wherein the neutron source positioning rodlet assembly comprises an upper coupling for connecting to the mounting assembly and an elongated substantially round body sized to slidingly fit within a guide thimble tube of a nuclear fuel assembly, the body extending a preselected distance from the upper coupling along an axis coinciding with an elongated dimension of the substantially round body and terminating in a lower coupling;
    manufacturing the source capsule assembly in a second manufacturing facility remote from the assembly site, the source capsule assembly sealably enclosing a neutron source material, with the source capsule assembly sized to slidingly fit within the guide thimble tube at the assembly site and having an upper coupling configured to mate with the lower coupling of the neutron source positioning rodlet assembly and wherein the preselected distance substantially extends from the mounting assembly to an elevation in the fuel assembly at which the neutron source material is to be situated;
    shipping the mounting assembly, the plurality of thimble plug rodlets or the plurality of burnable neutron poison rodlets and the neutron source positioning rodlet assembly to the assembly site;
    shipping the source capsule assembly to the assembly site;
    assembling the source capsule assembly to the lower coupling of the neutron source positioning rodlet assembly at the assembly site; and
    inserting the neutron source rod assembly into a fuel assembly at the assembly site.

11. The method of claim 10 wherein the assembly site is a nuclear reactor at which the neutron source rod assembly is used.

12. The method of claim 10 wherein the assembly site is a nuclear fuel assembly manufacturing facility.

13. The method of claim 10 wherein the mounting assembly, the plurality of thimble plug rodlets or the plurality of burnable neutron poison rodlets and the neutron source positioning rodlet assembly are assembled together at the first manufacturing facility.

14. The method of claim 10 wherein the mounting assembly, the plurality of thimble plug rodlets or the plurality of burnable neutron poison rodlets and the neutron source positioning rodlet assembly are assembled together at the assembly site.

* * * * *